United States Patent
Le Coarer et al.

(10) Patent No.: US 7,812,958 B2
(45) Date of Patent: Oct. 12, 2010

(54) INTERFERENTIAL SPECTROSCOPY DETECTOR AND CAMERA

(75) Inventors: Etienne Le Coarer, Grenoble (FR);
Pierre Benech, Grenoble (FR)

(73) Assignees: Universite Joseph Fourier (FR);
Institut National Polytechnique de Grenoble (FR)

( * ) Notice: Subject to any disclaimer, the term of this patent is extended or adjusted under 35 U.S.C. 154(b) by 42 days.

(21) Appl. No.: 11/792,977

(22) PCT Filed: Dec. 15, 2005

(86) PCT No.: PCT/FR2005/003147

§ 371 (c)(1),
(2), (4) Date: Jul. 16, 2007

(87) PCT Pub. No.: WO2006/064134

PCT Pub. Date: Jun. 22, 2006

(65) Prior Publication Data

US 2008/0130008 A1    Jun. 5, 2008

(30) Foreign Application Priority Data

Dec. 15, 2004    (FR) ................... 04 52992

(51) Int. Cl.
*G01J 3/45* (2006.01)
(52) U.S. Cl. ............................................. 356/451
(58) Field of Classification Search ................ 356/451, 356/477, 478
See application file for complete search history.

(56) References Cited

U.S. PATENT DOCUMENTS

| | | | |
|---|---|---|---|
| 4,755,668 A * | 7/1988 | Davis | 250/227.27 |
| 5,943,136 A | 8/1999 | Pipino et al. | |
| 6,044,102 A | 3/2000 | Labeyrie | |
| 2003/0026532 A1 * | 2/2003 | Murry et al. | 385/27 |
| 2003/0038938 A1 | 2/2003 | Jung et al. | |
| 2004/0071396 A1 | 4/2004 | Popov | |
| 2005/0260677 A1 * | 11/2005 | Saaski | 435/7.1 |
| 2006/0146337 A1 * | 7/2006 | Hartog | 356/478 |

* cited by examiner

*Primary Examiner*—Tarifur Chowdhury
*Assistant Examiner*—Jonathon D. Cook
(74) *Attorney, Agent, or Firm*—DLA Piper LLP (US)

(57) ABSTRACT

An interferential spectroscopy detector including a waveguide having an input side and a mirror on an opposite side, and means for detecting electromagnetic rays delivering an electric signal as a function of local intensity of an electromagnetic wave, detection being produced between an input side and the mirror.

20 Claims, 6 Drawing Sheets

INTERFERENTIAL SPECTROSCOPY DETECTOR AND CAMERA

RELATED APPLICATION

This is a §371 of International Application No. PCT/FR2005/003147, with an international filing date of Dec. 15, 2005 (WO 2006/064134 A1, published Jun. 22, 2006), which is based on French Patent Application No. 04/52992, filed Dec. 15, 2004.

TECHNICAL FIELD

This disclosure relates to the field of electronic detectors, more particularly, to an electronic detector making it possible to deliver spectral information about an electromagnetic field.

BACKGROUND

Present-day detectors do not have any capacity to measure the wavelength of an incident photon. At best, there exist superconductivity techniques of the Superconducting Tunnel Junction (STJ) type which are very complex to use and which offer only limited spectral resolution.

Photochemical molecules are also known that are capable of keeping memories of the wavelengths of the photons, but such molecules are limited to a very narrow spectral domain and require conversion using a costly scanner.

Furthermore, in general, field spectroscopy is performed by means of voluminous spectroscopes that distribute light over a two-dimensional detector.

In addition to such present-day detectors, it should be mentioned that, as early as 1891, Gabriel Lippmann proposed a detector based on silver halide sensitization in the thickness of a gelatin and using the effect produced by light reflecting off a mirror so as to generate a standing wave.

U.S. Pat. No. 6,044,102 discloses a method and a system for transmitting information by optical fiber. A light signal is emitted by a system based on a laser which multiplexes the information by using the inverse Lippmann effect. In the portion of U.S. Pat. No. '102 that addresses decoding the signal, it discloses a multiplexing system based on the Lippmann effect. Reference is then made to a light-sensitive medium disposed like its laser emission system, but a working practical embodiment is not given.

U.S. Pat. No. '102 discloses the use of the Lippmann effect, but it is limited to a narrow spectral domain of the same order as the bandwidth of the laser.

SUMMARY

We provide an interferential spectroscopy detector including a waveguide having an input side and a mirror on an opposite side, and means for detecting electromagnetic rays delivering an electric signal as a function of local intensity of an electromagnetic wave, detection being produced between an input side and the mirror.

We also provide a spectrometric imaging system including a plurality of interferential spectroscopy detectors, which detectors are disposed in a matrix configuration, input sides of the detectors lying in a focal plane of an input optical system.

We further provide an interferential spectroscopy detector including a waveguide having an input side and a mirror on an opposite side, and an electromagnetic ray detector delivering an electric signal as a function of local intensity of an electromagnetic wave, detection being produced between an input side and the mirror.

BRIEF DESCRIPTION OF THE DRAWINGS

The detectors can be better understood from the following description given merely by way of explanation and with reference to the accompanying figures, in which.

DETAILED DESCRIPTION

Figure 1:
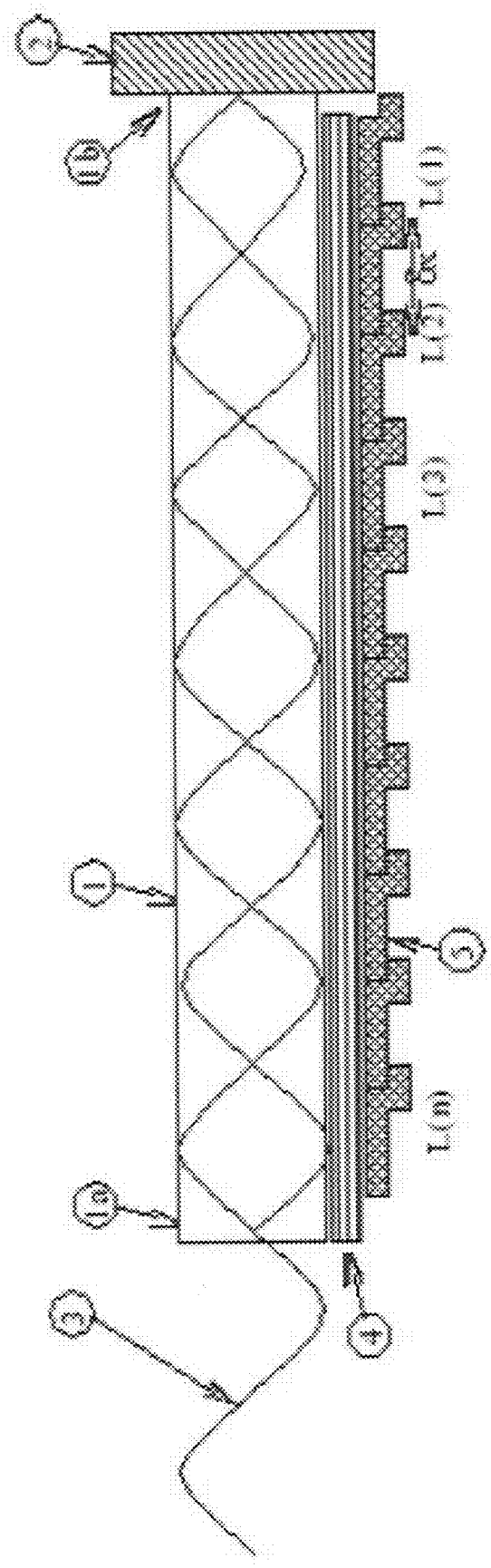
FIG. 1 shows a detector using a simple waveguide.

We use the Lippmann effect within a waveguide to mitigate the shortcomings of the prior art and, to this end, we provide an interferential spectroscopy detector comprising a waveguide having an input side and a mirror on the opposite side, and means for detecting electromagnetic rays delivering an electric signal as a function of the local intensity of the electromagnetic wave, the detection being produced between the input side and the mirror.

Preferably, the waveguide is of the single-mode type. It may also be multi-mode if certain resolution constraints are relaxed. Preferably, the detection means comprise a plurality of local detectors distributed between the input side and the mirror.

Advantageously, the detection means comprise at least one moving local detector mounted to move between the input side and the mirror.

In which case, the detector further comprises means for determining the position of the moving local detector to deliver signals as a function of the position of the local detector and of the local intensity of the electromagnetic wave.

In addition, the local detectors are either substantially equidistant or distributed in compliance with an aperiodic relationship to minimize the disturbance of the standing wave.

Preferably, consecutive local detectors are spaced apart by a distance substantially equal to one quarter of the wavelength corresponding to the lower value of the spectrum under study.

Advantageously, the detector further comprises a computer sampling the signals delivered by the local detectors, and determining the spectrum as a function of the sampled signals.

Preferably, the detector further comprises an analogue computer delivering the spectrum as a function of the signals delivered by the local detectors.

We also provide a spectrometric imaging system including a plurality of detectors, which detectors are disposed in a matrix configuration, the input sides of the detectors lying in the focal plane of an input optical system.

The matrix is either uniform or non-uniform.

The detector comprises an optical waveguide or "lightguide" 1. The term "waveguide" is used to designate in general a solid waveguide such as an optical fiber, or a hollow waveguide, or a line preceded by an antenna, such as a coaxial waveguide. It should be noted that the waveguide is preferably single-mode or "monomode". The dimensions of the system are thus comparable to a few wavelengths analyzed, and therefore very small compared with all of the prior art systems used for spectroscopy.

The waveguide 1 defines an input side 1a and an opposite side at the outlet side 1b. A mirror 2 is then positioned at the opposite side 1b of the waveguide.

A standing wave 3 is therefore generated within the waveguide 1 by the Lippmann effect.

The intensity of the standing wave satisfies a sinewave spatial distribution of the type $I(x)=1-\cos(4\Pi nx/\lambda)$, where I is intensity, x is distance to the mirror, n is refractive index of the medium through which the wave propagates, and $\lambda$ is wavelength.

The general principle is then to use light-sensitive local detectors making it possible to detect the light intensity and to retrieve the spectrum of the light.

In a first example, a plurality of fixed local detectors 5 are positioned outside the waveguide 1. For making the local detectors, it is possible, for example, to use a material that is sensitive to the evanescent waves coming from the waveguide 1. The detectors 5 then sample the intensity of the evanescent waves.

One skilled in the art can easily understand that if it is desired to detect a wavelength, the detectors are spaced apart by a distance substantially equal to $\lambda/4$, to reconstruct the corresponding signal.

For detecting a wider spectrum, this distance must be one quarter of the wavelength corresponding to the lower value of the spectrum under study. The lower wavelengths are then detected less effectively or indeed no longer contribute at all to the interference system.

When the spectrum is limited to a narrower spectral domain, it is possible to space the local detectors apart in a manner such as to subsample the interferogram while complying with Shannon's theorem in narrow band. In which case, the size of the detector must remain smaller than one quarter of the shortest wavelength.

The detector layer 5 thus comprises, for example, a plurality of mutually equidistant local detectors, but attention must be paid to the fact that uniform distribution can lead to transmission of the wave being disturbed by a Bragg effect.

To solve that problem, it is optionally possible to position a continuous light-sensitive medium between the waveguide and the uniformly spaced apart local detectors, or else to position the local detectors aperiodically such as, for example, with a spacing series that is defined by the sequence of prime numbers.

It should be noted that the detectors can be of various types. For example, they are photoconductive p-n junctions formed on a thinned semiconductive substrate having photodiodes and electrodes to collect a current at the terminals of the photodiodes. The substrate is disposed adjacent to the waveguide 1 either by molecular adhesion or adhesive bonding.

The detectors can also be microbolometers via superconductor wires forming an array distributed between the input side of the waveguide 1 and the mirror 2.

It is also possible to use microantennae, photoconductors of the selenium type or photodetectors of the Josephson effect type.

In a particular example, an optical element that is smaller than one quarter of the shortest wavelength analyzed by the system can also be situated in the vicinity of the waveguide or in the waveguide to take a fraction of the wave and convey it to a detector placed in the vicinity of the system, such as a Charge Coupled Device (CCD) pixel, for example. Such an optical element can be a diffusing point, a facet, or any material or system generating a diversion of the energy of the wave. Once the wave has been extracted from the waveguide, it is also possible to transmit the wave to a remote sensor to perform remote detection representative of the state of the wave inside the waveguide, between the input side and the mirror.

In this way, electromagnetic rays can be detected between the input side of the waveguide and the mirror by causing a fraction of the wave to exit via an optical element as described above. The optical element used for causing a fraction of the wave to exit from the waveguide is then part of the detection means, in which case detection can take place remotely from the waveguide, once a certain quantity of energy has been extracted from the waveguide.

Figure 3:
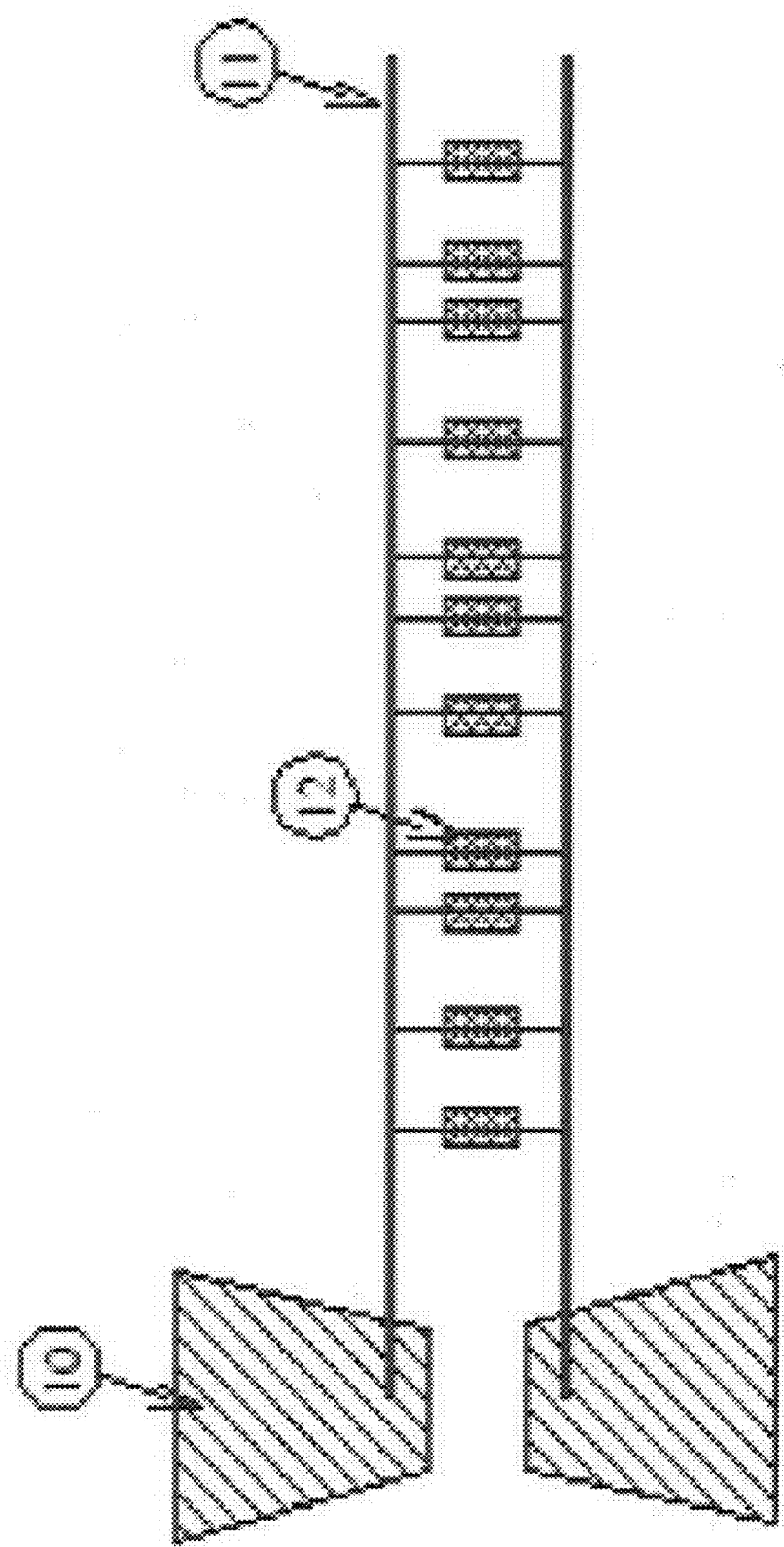
FIG. 3 shows a detector using a microwave frequency line in the field of radio.

FIG. 3 shows an example in the field of microwaves. An antenna 10 is positioned from which a line 11 extends that can be superconductive. The end of the line 11 behaves like a mirror. Elements 12 are N microbolometers that each take a fraction 1/N of the signal. The spacing between the bolometers is either uniform, or else non-uniform so as to avoid Bragg reflections.

Figure 4:
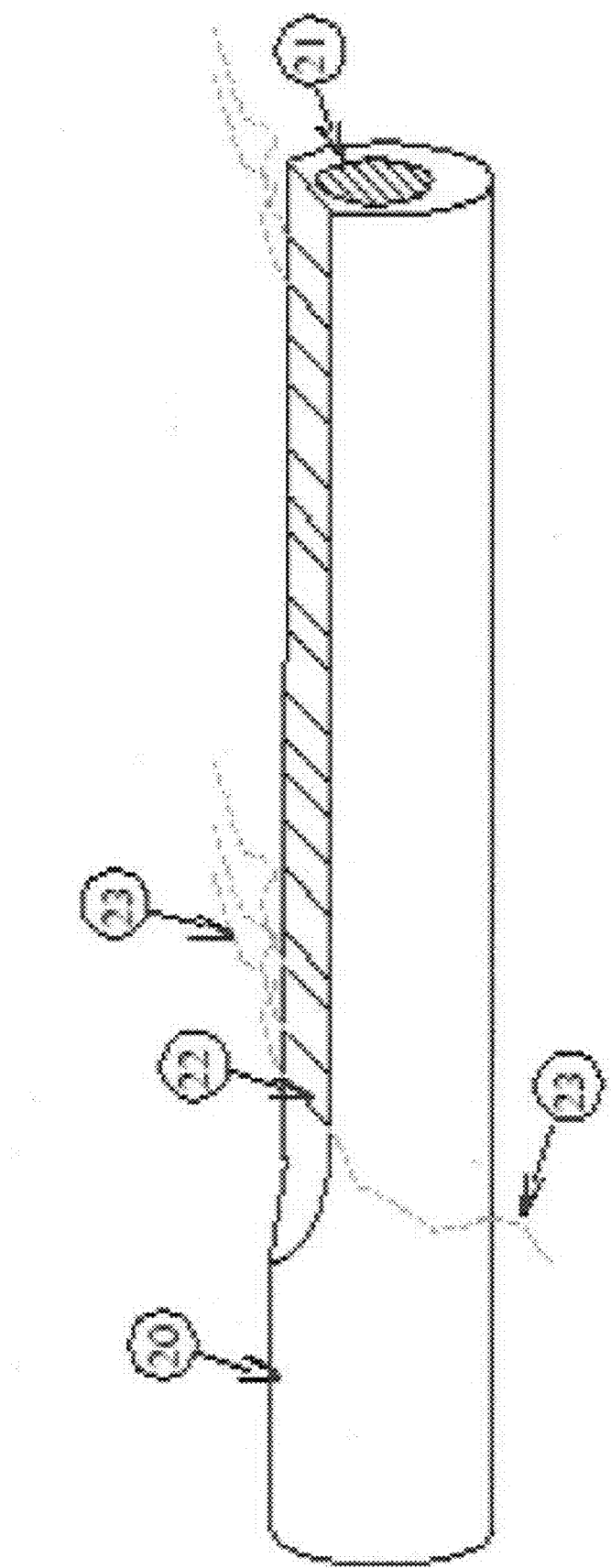
FIG. 4 shows a detector using an optical fiber that is polished to the core on which local detectors are disposed, such as Hot Electron Bolometer (HEB) superconductor wires.

FIG. 4 shows an example of this principle on the end of an optical fiber 20. A mirror 21 is disposed at the end of the core of the fiber. Local detectors 22 such as superconductor wires use the Hot Electron Bolometer (HEB) effect. That effect is, for example, described in the publication by Romestain et al. in the New Journal Of Physics, Volume 6, 2004. Wires 23 establish the connection with the electronics.

This configuration is used for planar waveguides.

In a second example (not shown), detection is performed by one or more moving detectors mounted to move between the input side and the mirror. In which case, the device includes means for determining the position of the detector.

The moving detectors used can then be of the type described above.

It should be understood that, in both of the above-described examples, the detectors are situated outside the waveguide and they measure the intensity of the evanescent waves. However, it is possible to position the detectors within the waveguide itself to make the measurements on the standing wave itself. But, in that case, the presence of the detector causes light reflections that might need to be corrected.

In both of the examples, after detection has been performed by the detector(s), the delivered signals are sampled. The device further comprises multiplexing systems for multiplexing the information from the local detectors, a computer that can be a processor, a microprocessor, or a Digital Signal Processor (DSP), for analogue or digital processing.

The spectrum of the wave is then obtained by Fourier transform of the signals delivered by the detector(s).

It is also possible to obtain the spectrum of the wave by regression relative to a table of fixed values.

Figure 2:
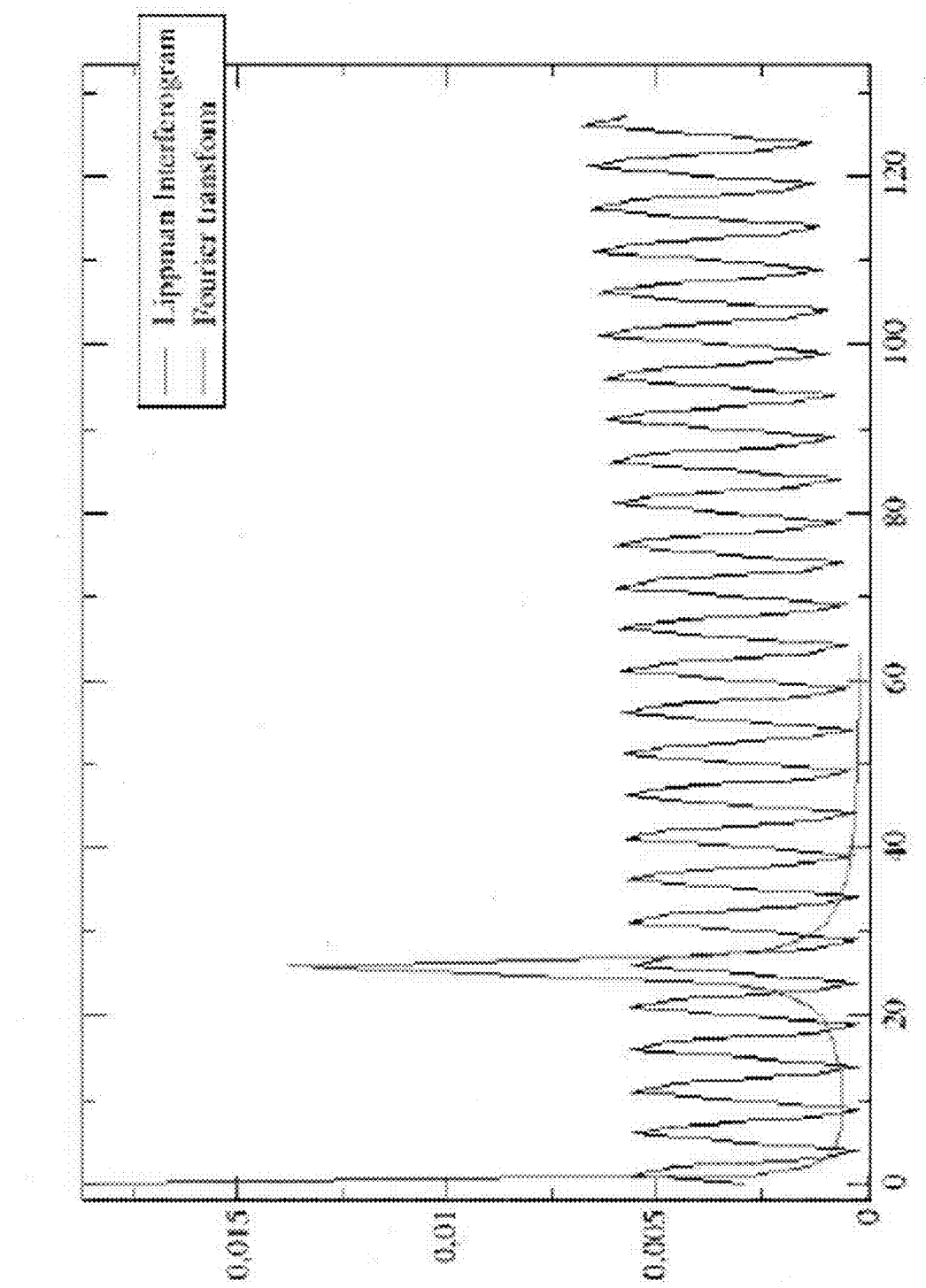
FIG. 2 shows an example of an interferogram obtained by the detector.

FIG. 2 then shows an example of an interferogram obtained by means of the detector for a monochromatic wave.

Figure 5:
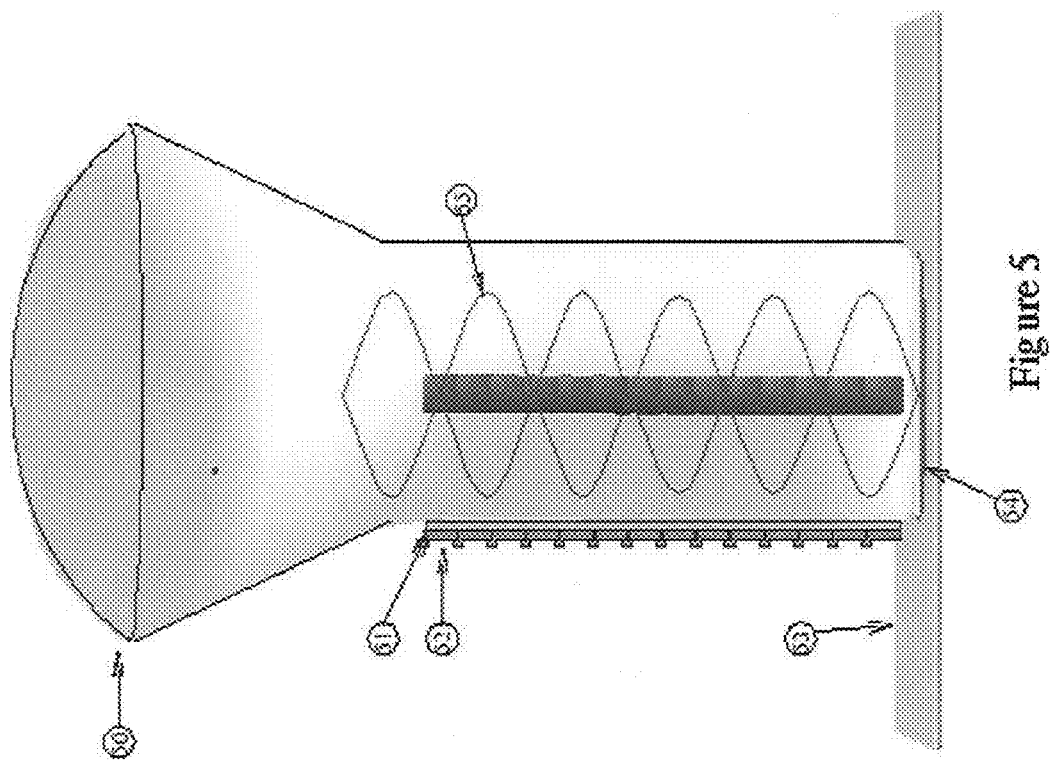
FIG. 5 shows a detector using an element provided with a microlens for matching to the single-mode waveguide, which element is disposed perpendicularly to the surface of a substrate of the integrated circuit type so as to form a matrix.
Figure 6:
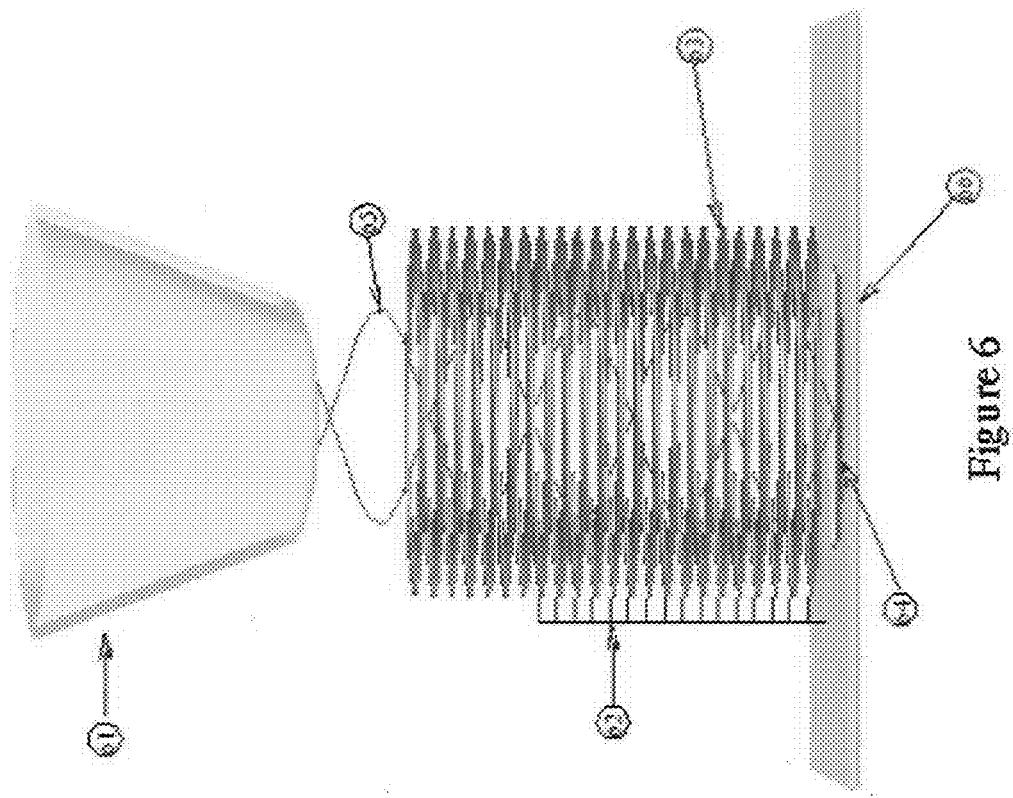
FIG. 6 shows a detector as in FIG. 5 that uses a horn instead of the microlens, and an example of an annular local detector.

We also provide a spectrometric imaging system including a plurality of detectors as described above, disposed in a matrix configuration. FIGS. 5 and 6 show two examples of a component element of the plurality of detectors disposed at the surface a support of the detector matrix. A mircolens or a horn makes it possible to match the wave to the single-mode waveguide and frees space on the support that makes it possible to integrate the electronics necessary for operation of the detector.

In FIGS. 5 and 6 it is possible to recognize the main elements of the above-described detectors, with a mirror 54, 64, a support 53, 66 supporting the waveguide and the mirror, and a set of detectors 52, 62.

To make measurements on the waves at the matrix, an optical system is also used that is disposed such that the matrix of detectors is in the focal plane of the optical system.

The signals from all of the detectors of the matrix are retrieved, and the spectrum is thus reconstructed for all of the points by a computer as described above. A spectral image is thus obtained.

It should be understood that, to minimize the computation time for a large number of detectors forming a detection matrix, it is possible to parallelize the processing.

The devices are described above by way of example. It should be understood that one skilled in the art is capable of implementing various variants without going beyond the scope of the appended claims.

The invention claimed is:

1. An interferential spectroscopy detector comprising:
   a waveguide having an input side and a single mirror on an opposite side, and
   means for detecting electromagnetic rays, the mirror generating an electromagnetic standing wave within the waveguide by the Lippmann effect and the means for detecting being distributed between the input side and the mirror to detect local intensity of the generated standing wave and deliver an electric signal as a function of said local intensity, detection being realized between the input side and the mirror so that the interferential spectroscopy detector measures the spectral distribution of the standing wave.

2. The detector according to claim 1, wherein the detection means comprise at least one optical element suitable for extracting at least a fraction of the electromagnetic wave from the waveguide.

3. The detector according to claim 1, wherein the detection means comprise a plurality of local detectors distributed between the input side and the mirror.

4. The detector according to claim 1, wherein the detection means comprise at least one local detector mounted to move between the input side and the minor.

5. The detector according to claim 4, further comprising means for determining a position of local detector to deliver signals as a function of the position of the local detector and local intensity of the standing wave.

6. The detector according to claim 3, wherein the local detectors are substantially equidistant.

7. The detector according to claim 3, wherein the local detectors are distributed in compliance with an aperiodic relationship to minimize disturbance of the standing wave.

8. The detector according to claim 3, wherein consecutive local detectors are spaced apart by a distance substantially equal to one quarter of the wavelength corresponding to the lower value of the spectrum under study.

9. The detector according to claim 6, wherein consecutive local detectors are spaced apart by a distance substantially equal to one quarter of the wavelength corresponding to the lower value of the spectrum under study.

10. The detector according to claim 3, wherein the detectors are smaller than one quarter of the wavelength corresponding to the lower value of the spectrum under study.

11. The detector according to claim 6, wherein the detectors are smaller than one quarter of the wavelength corresponding to the lower value of the spectrum under study.

12. The detector according to claim 4, further comprising a computer sampling signals delivered by the local detectors, and determining the spectrum as a function of the sampled signals.

13. The detector according to claim 4, further comprising an analogue computer delivering the spectrum as a function of signals delivered by the local detector(s).

14. The detector according to claim 1, wherein the waveguide is of the single-mode type.

15. A spectrometric imaging system comprising a plurality of detectors according to claim 1, which detectors are disposed in a matrix configuration, input sides of the detectors lying in a focal plane of an input optical system.

16. The spectrometric imaging system according to claim 15, wherein the matrix is uniform.

17. The spectrometric imaging system according to claim 15, wherein the matrix is non-uniform.

18. An interferential spectroscopy detector comprising:
    a waveguide having an input side and a single mirror on an opposite side,
    an electromagnetic ray detector,
    the mirror generating an electromagnetic standing wave within the waveguide by the Lippmann effect and the electromagnetic ray detector being distributed between the input side and the mirror to detect local intensity of the generated standing waveguide and deliver an electric signal as a function of the local intensity, detection being realized between the input side and the mirror so that the inferential spectroscopy detector measures the spectral distribution of said standing wave.

19. The detector according to claim 18, wherein the electromagnetic ray detector comprises a plurality of local detectors distributed between the input side and the mirror.

20. The detector according to claim 18, wherein the electromagnetic ray detector comprises at least one local detector mounted to move between the input side and the mirror.

* * * * *